US008427548B2

(12) United States Patent
Lim et al.

(10) Patent No.: US 8,427,548 B2
(45) Date of Patent: Apr. 23, 2013

(54) APPARATUS AND METHOD FOR CAPTURING DIGITAL IMAGES

(75) Inventors: Jae-guyn Lim, Yongin-si (KR);
Byung-Kwan Park, Seoul (KR);
Seong-deok Lee, Suwon-si (KR);
Young-kyoo Hwang, Seoul (KR);
Hyun-wook Ok, Seoul (KR);
Joo-Young Kang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 475 days.

(21) Appl. No.: 12/379,543

(22) Filed: Feb. 24, 2009

(65) Prior Publication Data
US 2009/0316014 A1 Dec. 24, 2009

(30) Foreign Application Priority Data

Jun. 18, 2008 (KR) ........................ 10-2008-0057363

(51) Int. Cl.
*H04N 5/228* (2006.01)
(52) U.S. Cl.
USPC ...................................... 348/222.1
(58) Field of Classification Search ............... 348/222.1, 348/289, 290, 291, 335, 342, 345; 359/10, 359/560, 564, 619
See application file for complete search history.

(56) References Cited

U.S. PATENT DOCUMENTS

| 4,360,797 | A * | 11/1982 | Fenimore et al. | 382/278 |
|---|---|---|---|---|
| 7,671,321 | B2 * | 3/2010 | Perlman et al. | 250/216 |
| 7,792,423 | B2 * | 9/2010 | Raskar et al. | 396/268 |
| 2005/0030625 | A1 * | 2/2005 | Cattin-Liebl | 359/560 |
| 2006/0157640 | A1 * | 7/2006 | Perlman et al. | 250/208.1 |
| 2008/0151391 | A1 * | 6/2008 | Zalevsky et al. | 359/739 |
| 2008/0259354 | A1 * | 10/2008 | Gharib et al. | 356/601 |
| 2009/0140131 | A1 * | 6/2009 | Utagawa | 250/226 |
| 2009/0303377 | A1 * | 12/2009 | Meisenzahl | 348/340 |
| 2010/0220212 | A1 * | 9/2010 | Perlman et al. | 348/229.1 |

* cited by examiner

*Primary Examiner* — Aung S Moe
*Assistant Examiner* — Chriss Yoder, III
(74) *Attorney, Agent, or Firm* — Staas & Halsey LLP

(57) ABSTRACT

An apparatus and method for capturing digital images are provided. The digital capturing apparatus includes an image pickup unit obtaining light field data to change a view of a captured image and refocus the captured image, and a data processor generating a refocusing image using the light field data, wherein the image pickup unit performs optical modulation on light beams to obtain light field data of the modulated light beams so that the light beams are identified when two or more of the light beams overlap, and the data processor demodulates the light field data to obtain light field data of the light beams not subjected to the optical modulation.

21 Claims, 9 Drawing Sheets

FIG.6

$$f = \begin{bmatrix} + & + & + & + \\ + & - & + & - \\ + & + & - & - \\ + & - & - & + \end{bmatrix}$$

$$g = \begin{bmatrix} + & + & - & - \\ + & - & - & + \\ + & + & + & + \\ + & - & + & - \end{bmatrix}$$

APPARATUS AND METHOD FOR CAPTURING DIGITAL IMAGES

CROSS-REFERENCE TO RELATED APPLICATIONS

This application claims priority from Korean Patent Application No. 10-2008-0057363, filed on Jun. 18, 2008, the disclosure of which is incorporated herein in its entirety by reference.

BACKGROUND

1. Field

One or more embodiments of the present invention relate to a system of capturing digital images, and more particularly, to a system for capturing digital images, capable of adjusting a view of a captured image and refocusing the captured image.

2. Description of the Related Art

Recently, research into plenoptic cameras has been underway. A plenoptic camera is also called a light field camera, and captures 4D optical field information regarding scenes using a microlens array (generally, referred to as a Lenticular lens array) or a light coded mask.

In a plenoptic camera, a microlens array is positioned between a camera lens and an image sensor and adjusts the focuses of light beams that are to be incident upon the image sensor to create a plurality of images captured at different viewpoints, so that an image whose focus or viewpoint is adjusted can be provided using the plurality of images.

SUMMARY

One or more embodiments of the present invention relate to a method and apparatus for capturing digital images, capable of preventing spatial resolution from deteriorating when light field data is obtained.

According to an aspect of the present invention, there is provided a digital image capturing apparatus, including an image pickup unit obtaining light field data to change a view of a captured image and refocus the captured image, and a data processor generating a refocusing image using the light field data, wherein the image pickup unit performs optical modulation on light beams to obtain light field data of the modulated light beams so that the light beams are individually identified when two or more of the light beams overlap, and the data processor demodulates the light field data to obtain demodulated light field data of the light beams not subjected to the optical modulation.

According to another aspect of the present invention, there is provided a method of capturing digital images, including performing optical modulation on light beams so that the light beams are individually identified when two or more of the light beams overlap, obtaining light field data of the modulated light beams to refocus an image captured from the modulated light beams, demodulating the light field data and generating demodulated light field data of the light beams not subjected to the optical modulation, and generating a refocused image using the generated light field data.

Additional aspects and/or advantages will be set forth in part in the description which follows and, in part, will be apparent from the description, or may be learned by practice of the invention.

It is to be understood that both the foregoing general description and the following detailed description are exemplary and explanatory and are intended only to provide further non-limiting explanation of the invention as claimed.

BRIEF DESCRIPTION OF THE DRAWINGS

These and/or other aspects and advantages will become apparent and more readily appreciated from the following description of the embodiments, taken in conjunction with the accompanying drawings of which:

FIG. 6 shows functions used in a modulator according to another exemplary embodiment;

DETAILED DESCRIPTION OF EMBODIMENTS

Figure 1:
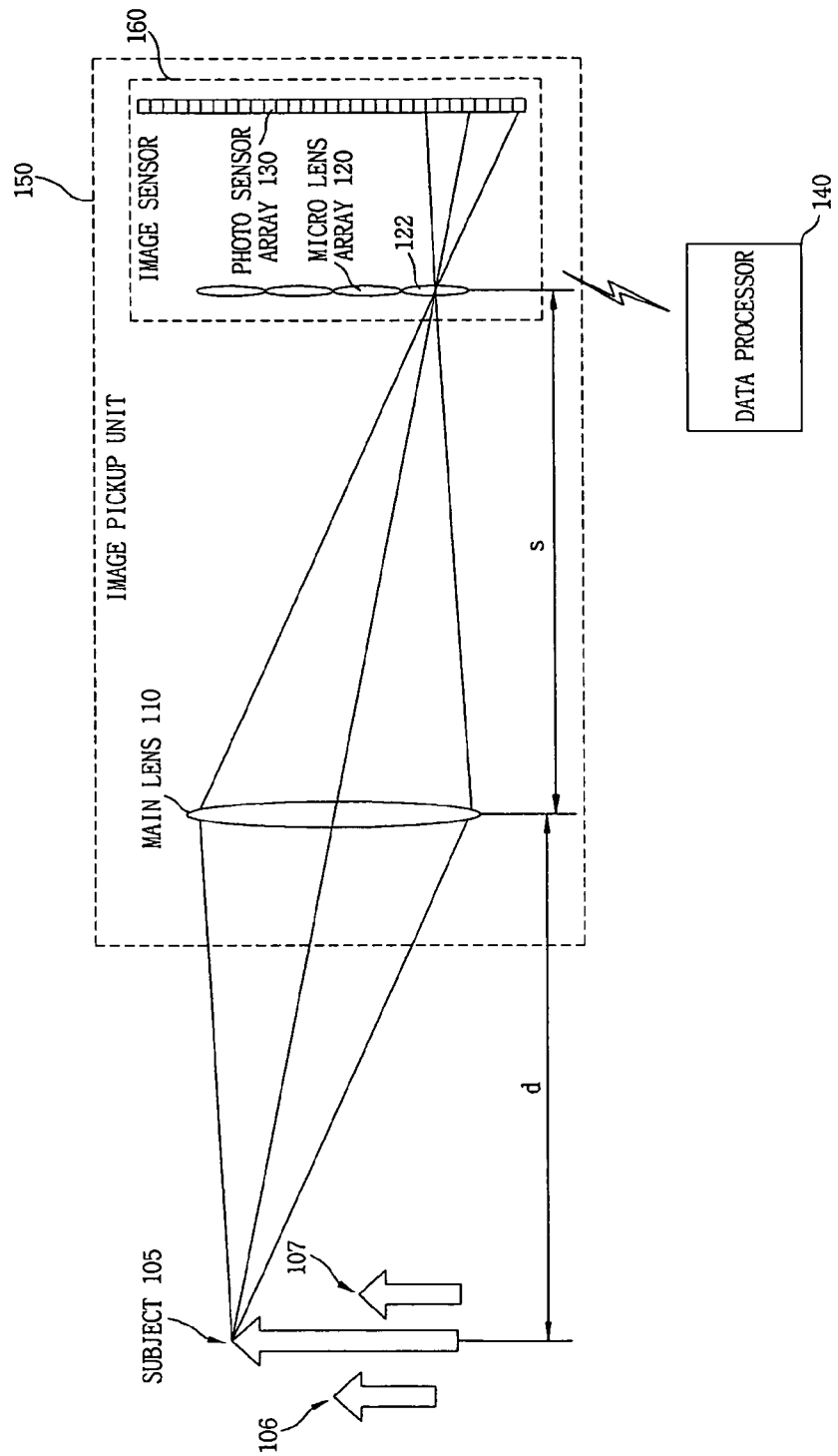
FIG. 1 shows a construction of a conventional plenoptic camera.

Reference will now be made in detail to embodiments, examples of which are illustrated in the accompanying drawings, wherein like reference numerals refer to the like elements throughout. The invention may, however, be embodied in many different forms and should not be construed as limited to the exemplary embodiments set forth herein. In the drawings, the size and relative sizes of layers and regions may be exaggerated for clarity.

FIG. 1 shows a construction of a conventional plenoptic camera.

Referring to FIG. 1, an image capturing apparatus, which is installed in the conventional plenoptic camera, includes a main lens 110, and an image pickup unit 150 having a microlens array 120 and a photo sensor array 130. Here, the microlens array 120 and the photo sensor array 130 construct an image sensor 160. The image capturing apparatus can obtain refocused images or images captured at different viewpoints. That is, the image capturing apparatus can adjust the views of images.

Light beams from a single point on a subject 105 in an imaged scene are brought to a single convergence point on a focal plane of the microlens array 120. A microlens 122 at the convergence point separates the light beams based on the directions of the light beams, and creates a focused image of the aperture of the main lens 110 on the photo sensor array 130 which is beyond the microlens 122.

The photo sensor array 130 detects light incident thereon, and generates optical data using one or more of various components of the incident light. The optical data is sent to a data processor 140 which will process the optical data, together with positional information of a photo sensor (or photo sensors) providing the optical data, for example, when a scene image including subjects 105, 106, and 107 is created.

The data processor 140 may be a computer or other processing circuit selectively implemented in a common component (e.g., a chip) or in different components.

A portion of the data processor 140 is implemented in the image pickup unit 150, with another portion implemented in an external computer. The data processor 140 processes the optical data and creates an imaged scene image including the subjects 105, 106, and 107.

The data processor 140 selectively refocuses or corrects the optical data in forming an image, using the detected light (e.g., the characteristics of the detected light) together with a known direction from which the light arrived at the microlens array as computed using a known location of each photosensor.

The image capturing apparatus can be implemented in various ways according to the types of applications. The microlens array 120 is shown as an array of several distinguishable microlenses, actually, will be an array in which thousands or millions of microlenses are arranged. In the photo sensor array 130, a predetermined number of photo sensors are provided in correspondence to each microlens in the microlens array 120.

The size (that is, the pitch) of each pixel in the photo sensor array 130 is smaller than the size of each pixel in the microlens array 122. Also, the microlenses in the microlens array 120 and the photo sensors in the photo sensor array 130 are generally intentionally positioned in such a manner that light passing through each microlens to the photo sensor array 130 does not overlap light passing through the adjacent microlens.

The main lens 110 is moved along its optical axis, that is, in a horizontal direction, as shown in FIG. 1, to focus on a target subject at a desired depth "d" as exemplified between the main lens 110 and an example image subject 105. Accordingly, the main lens 110 can refocus light beams on a desired location based on obtained light field data.

For example, light beams starting from a single point on the subject 105 are shown to describe the refocusing operation. The light beams are brought to a single convergence point at a microlens 122 on the focal plane of the microlens array 120. The microlens 122 separates the light beams based on the incident directions of the light beams, and creates a focused image corresponding to the aperture of the main lens 110 on the photo sensor array 130 beyond the microlens 122, and also generates light field data of the focused image.

If a 2-plane optical field in the image capturing apparatus is denoted by "L", light field data L(u,v,s,t) indicates a light beam which intersects the main lens 110 at a point (u, v) and intersects the plane of the microlens array 120 at a point (s, t). For example, the light field data L(u,v,s,t) represents an intensity value of a light beam which passes through the location (u, v) of a sub-aperture of the main lens 110 and passes through the location (s, t) of a microlens, wherein the sub-aperture means the number of directional resolution of the main lens 110. For example, if the number of sub-apertures of the main lens 110 is 196, each microlens 122 corresponds to 196 pixels.

Each photo sensor in the photo sensor array 130 can provide a value indicating a set of light beams that pass through the main lens 110 and the microlens array 120 to the photo sensor. That is, each photo sensor generates an output in response to a light beam incident on the photo sensor, and the location of each photo sensor with respect to the microlens array 120 is used to provide directional information of the incident light beam.

The data processor 140 can generate a refocusing image using the light field data, that is, L(u, v, s, t). At this time, the data processor 140 determines the direction of the light beam incident on each photo sensor, using positional information of the photo sensor with respect to the microlens through which the light beam has passed. Also, the data processor 140 can determine a view depth of a subject in a scene over which the detected light beam spreads out, and create a composed image focused on a different virtual focused plane from the focal plane, using the view depth and the direction of the detected light beam.

Meanwhile, the image that forms under a particular microlens in the microlens array 122 dictates the directional resolution of the system for that location on the imaging plane. The main lens 110 is at an optically infinite distance from the microlens array 120, and the photo sensor array 130 is located in a plane at the microlens's focal depth in order to focus the microlens.

The distance "s" between the main lens 110 and the microlens array 120 is set to a value suitable to obtain a high-definition image within a view depth of the microlenses of the microlens array 120.

The size of the aperture of the main lens 110 and the size (for example, the effective size of an opening) of the aperture of each microlens of the microlens array 120 are selected to values suitable to a specific application as which the image capturing apparatus is implemented. The size value of the aperture of the main lens 110 and the size value of the aperture of each microlens can be easily determined by matching the f-number (focal ratios: i.e., a ratio of the aperture to an effective focus length of the lens) of the main lens 110 and the microlens.

Figure 2:
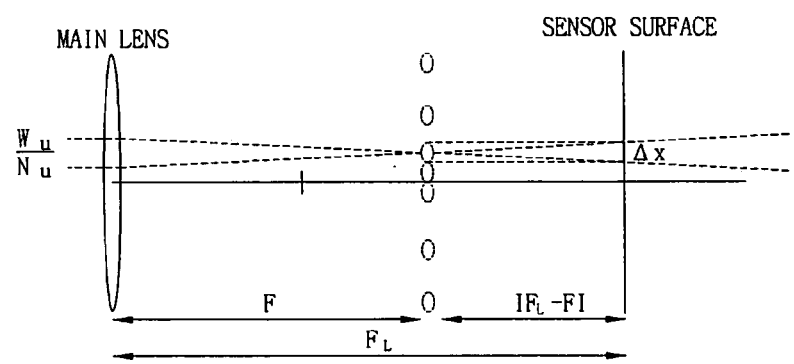
FIG. 2 is a view for explaining a relationship between directional resolution and spatial resolution of a plenoptic camera and the size of one pixel of a photo sensor.

FIG. 2 is a view for explaining a relationship between directional resolution and spatial resolution of a plenoptic camera and the size of a pixel of a photo sensor.

The spatial sampling rate and directional sampling rate of the camera are referred to as "$\Delta x$" and "$\Delta u$", respectively. The width of a camera sensor of the camera is referred to as "$W_x$", and the width of a lens aperture of the camera is referred to as "$W_u$". In this case, the spatial resolution of a photo sensor of the camera is $N_x = W_x / \Delta x$, and the directional resolution of a photo sensor of the camera is $N_u = W_u / \Delta u$.

In order to perform refocusing at a desired distance, the following Equation 1 has to be satisfied.

$$\Delta x \cdot N_U \geq \frac{|F - F_L|}{F_L} \cdot W_U \qquad \text{Equation 1}$$

Here, F represents a focus distance of a main lens, and $F_L$ represents the range of focal depths, where we can achieve "exact" focusing, i.e., compute a sharp rendering of the photograph focused at the depth. That is, F and $F_L$ represent the range of a focus depth for achieving correct refocusing.

For example, if $W_u = 20$ mm and F=80 mm and an object that is to be refocused is in the distance of 1 m, when the values are applied to Equation 1, $\Delta x \cdot N_u \geq 1.59$ mm. In a sensor consisting of 4145×4145 pixels, if target spatial resolution of an image is 400×1400, the number of pixels by which directional resolution can be represented is 3 (=4150/1400).

However, if the range of refocusing is set to a range of 1 m to ∞ and the pitch of each pixel of the sensor is 9 μm, a value $N_u$ of required directional resolution should be more than 58 (=1.59 mm/3 pixels×9 μm). That is, in the case where the range of refocusing is set to the range of 1 m to ∞, spatial resolution of 1400×1400 cannot be satisfied. Accordingly, it is needed to change the range of refocusing or target spatial resolution.

The following Table shows values of allowable $\Delta x$ and required $N_u$ to satisfy target directional resolution and target spatial resolution under above conventional assumption.

TABLE 1

| | Spatial ratio | | | |
|---|---|---|---|---|
| | 1400 × 1400 | 700 × 700 | 350 × 350 | 300 × 300 |
| Allowable Δx | 27 μm (3 pixels) | 54 μm (6 pixels) | 108 μm (12 pixels) | 126 μm (14 pixels) |
| Required $N_u$ | 58 | 30 | 15 | 13 |

Referring to Table 1, when the range of refocusing is set from 1 m to ∞ and spatial resolution is set to 300×300, directional resolution of 13×13 and the refocusing range of 300×300 can be obtained. That is, when the size of a sensor is constant, the target spatial resolution cannot be obtained and a large-sized sensor is needed to obtain the target spatial resolution.

According to an embodiment of the present invention, in order to resolve the above problem, a method of reducing the number of pixels of a photo sensor for representing directional resolution is proposed. That is, by reducing allowable Δx for representing directional resolution, for example, by causing information of directional resolution 13×13 to be represented by 6×6 pixels, an image with spatial resolution of 700×700 can be created, instead of a conventional image with spatial resolution of 300×300.

For the purpose, according to an exemplary embodiment, by modulating two or more light beams before the light beams reach the photo sensor to form an image and then overlapping the light beams passing through the microlens on one pixel of the photo sensor, a problem that spatial resolution is lowered can be resolved. In detail, by overlapping light field data for two or more light beams on a pixel and allowing a data processor to demodulate light field data of the light beams, spatial resolution can be improved.

Figure 3:
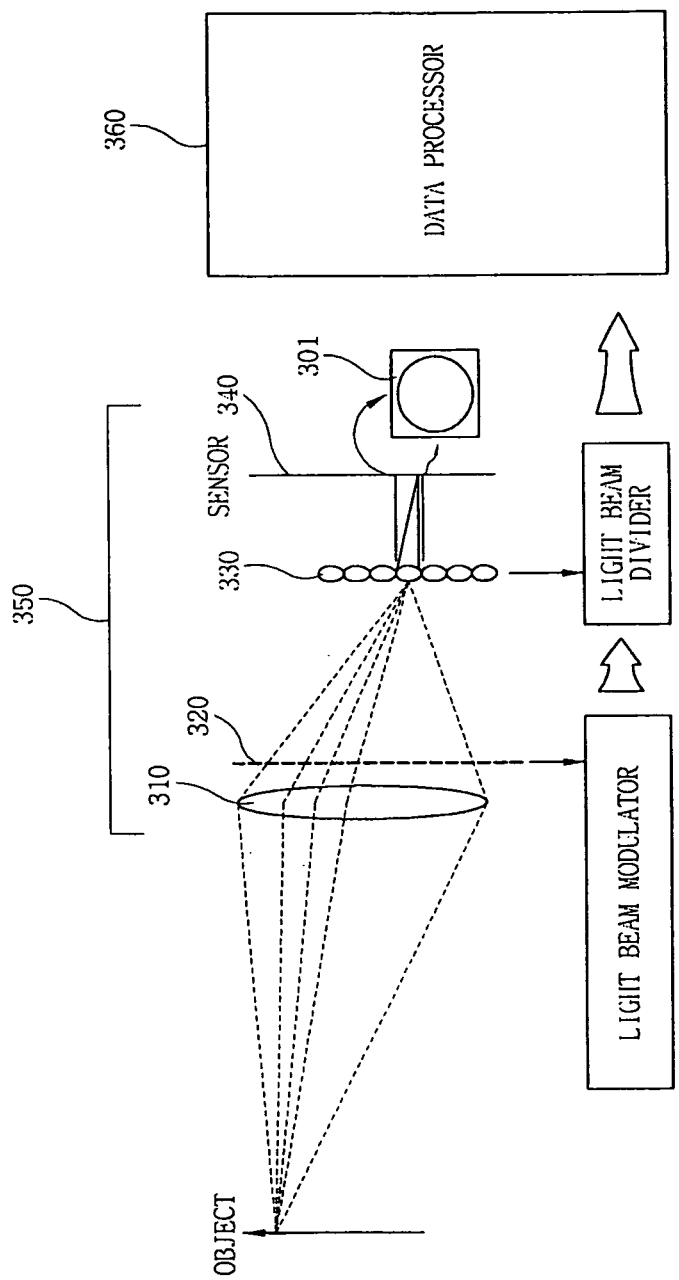
FIG. 3 shows a construction of an apparatus of capturing digital images, according to an exemplary embodiment.

FIG. 3 shows the construction of an apparatus of capturing digital images, according to an exemplary embodiment.

According to an exemplary embodiment, the digital image capturing apparatus includes an image pickup unit 350 and a data processor 360. The image pickup unit 350 obtains light field data of a captured image to change a view of the captured image or refocus the captured image, and the data processor 360 creates a focused image using the light field data. Also, the image pickup unit 350 performs optical modulation on received light beams so that the light beams can be identified when at least two of the light beams overlap, and correspondingly the data processor 360 demodulates light field data obtained by the optical modification to thus obtain original light field data.

According to an exemplary embodiment, the image pickup unit 350 includes a main lens 310, a modulator 320, a microlens array 330, and a photo sensor array 340. The construction of the main lens 310, microlens array 330 and photo sensor array 340 corresponds to the construction of the main lens 110, microlens array 120 and photo sensor array 130 of the conventional digital image capturing apparatus described above with reference to FIG. 1. The main lens 310 (a single lens) and/or microlens array 330 shown in FIG. 3 can be substituted by a variety of main lens and/or microlens array currently available or developed in the future. Also, the microlens array 330 can be substituted by a light coded mask.

The microlens array 330 is disposed between the main lens 310 and the photo sensor array 340. The microlens array 330 orients a set of light beams transmitted from the main lens 310 physically toward the photo sensor array 340. Also, each microlens included in the microlens array 330 causes at least two light beams subjected to optical modulation to overlap on a sensor pixel of the photo sensor 340. The data processor 360 creates a refocused image using light field data for the light beams.

According to an exemplary embodiment, the image pickup unit 350 performs optical modulation on received light beams so that the light beams can be identified when at least two of the light beams overlap, thus obtaining light field data. The data processor 360 demodulates the light field data obtained by the optical modulation, thereby obtaining original light field data.

Also, the modulation unit 320 can operate based on a CDMA communication method. In the CDMA communication method, if a transmitter multiplies two or more different messages by the corresponding inherent codes and then transmits the resultant messages simultaneously to a receiver, the receiver can create the original different messages using the inherent codes.

That is, the modulator 320 performs convolution of light beams and the corresponding inherent codes, like the CDMA communication method multiplies signals by the corresponding inherent codes. The modulator 320 may be a 2-dimensional orthogonal mask for modulating light beams using two or more orthogonal functions. The light beams modulated by the modulator 320 overlap on a pixel of the photo sensor 340. The data processor 350 for processing data sensed by the photo sensor 340 can demodulate light field data using two or more orthogonal functions, like a receiver receives signals modulated by the CDMA communication method and creates original signals.

In other words, the modulator 320 overlaps information of directional resolution and thus improves spatial resolution. Since the information of directional resolution creates original directional resolution through demodulation of the data processor 360, there is no change in directional resolution.

Figure 4:
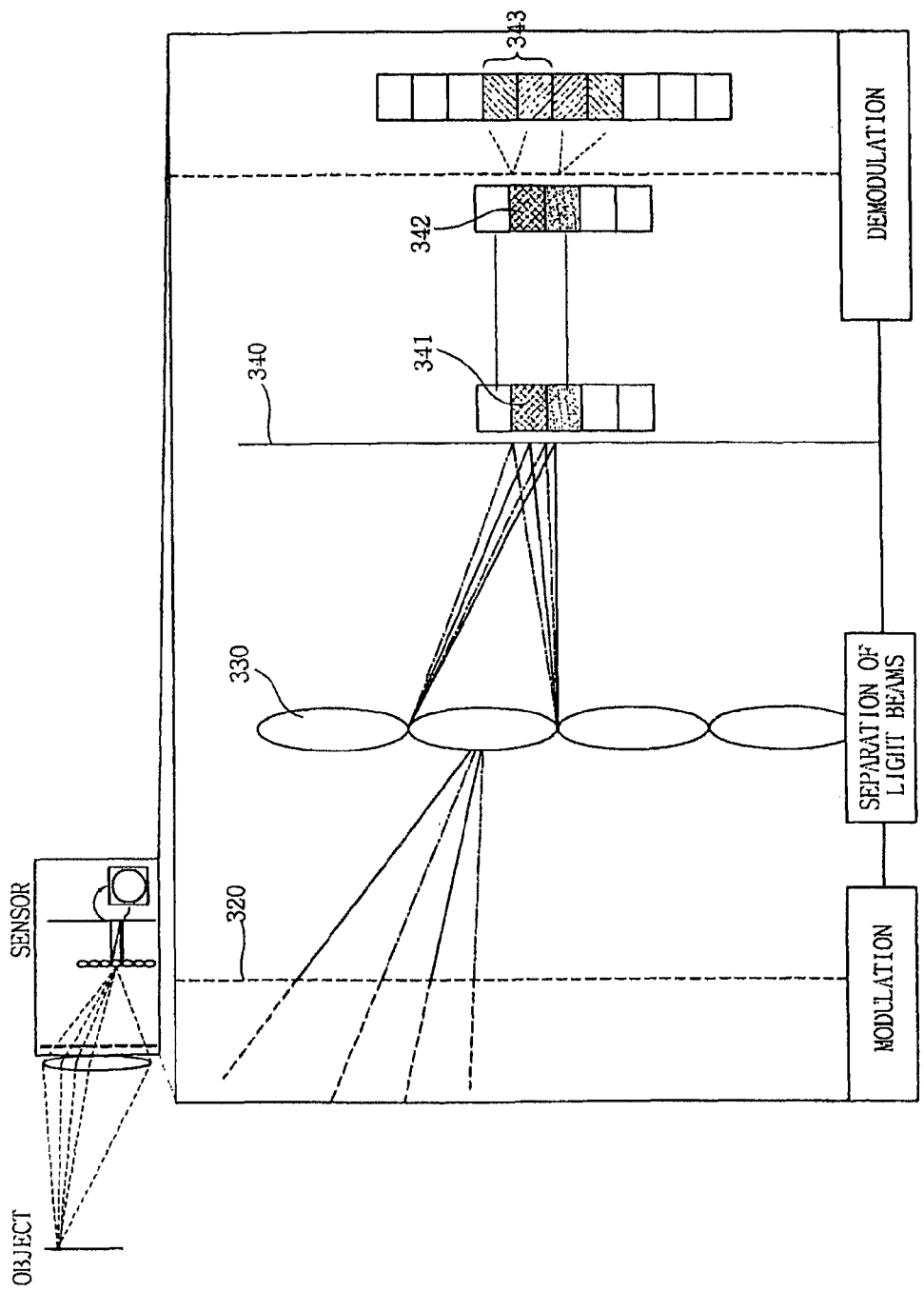
FIG. 4 is a view for explaining a method of modulating light beams, overlapping the modulated light beams on each pixel of a photo sensor, and demodulating the overlapping light beams, according to an exemplary embodiment.

FIG. 4 is a view of explaining a method of modulating light beams, overlapping the modulated lights on each pixel of a photo sensor and demodulating the overlapping light beams, according to an exemplary embodiment.

As illustrated in FIG. 4, if light beams pass through a modulator 320, the light beams can be identified when two or more of the light beams overlap. Accordingly, if light beams including two pieces of directional resolution information are converged on a pixel 341 of the photo sensor 340, the data processor 350 obtains sensor data 342 from the pixel 341, and demodulates the sensor data 342 to thus obtain light field data 343 including two pieces of directional resolution information.

Figure 5A:
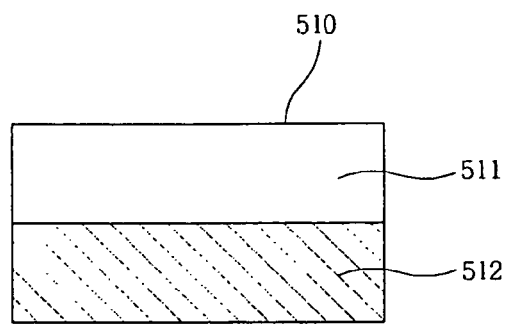
FIGS. 5A and 5B show modulators according to exemplary embodiments.
Figure 5B:
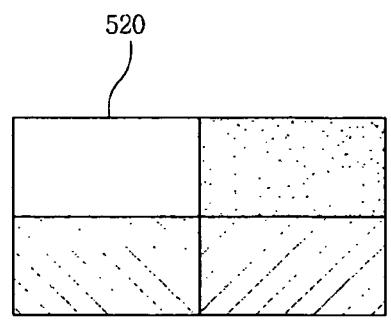
Figure 7A:
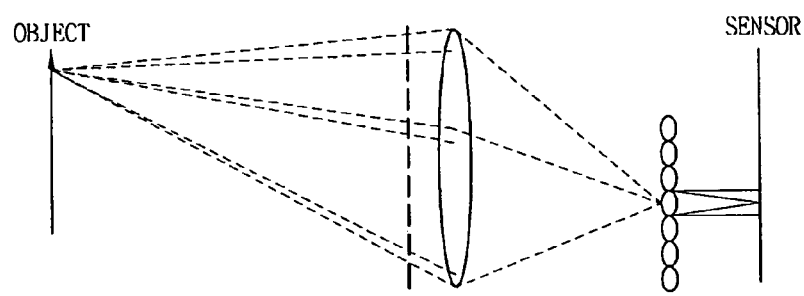
FIGS. 7A through 7D show the locations of a modulator, according to exemplary embodiments.
Figure 7B:
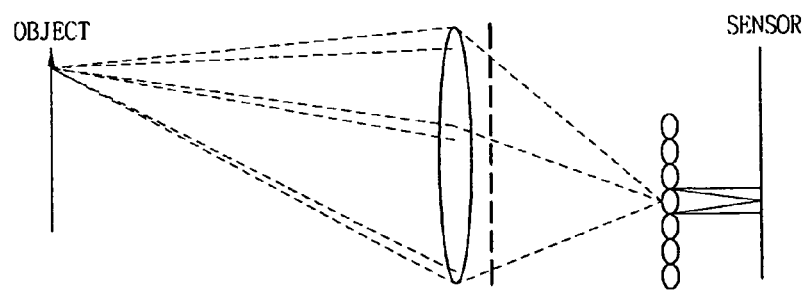
Figure 7C:
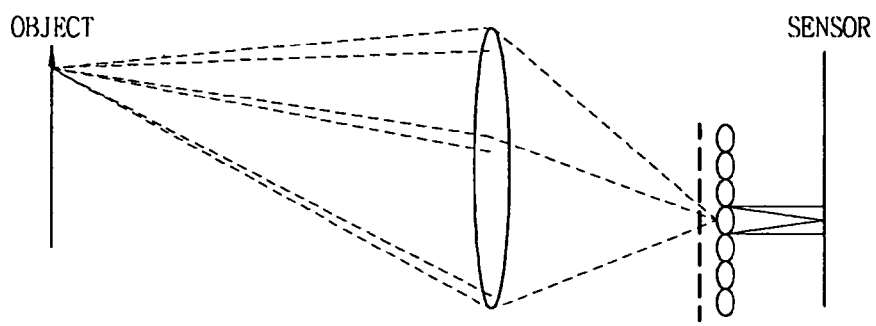
Figure 7D:
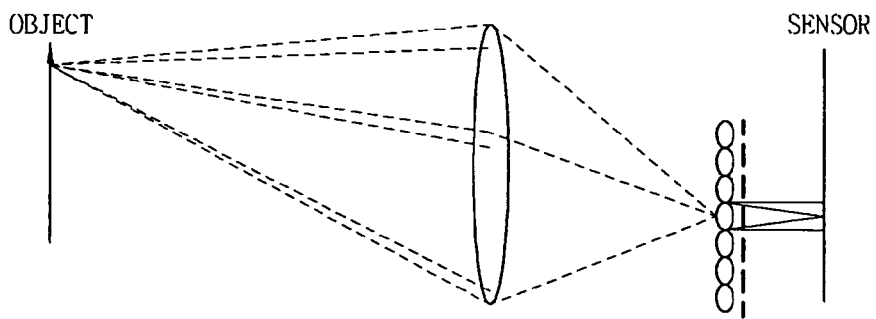

FIGS. 5A and 5B show modulators according to exemplary embodiments.

The modulator illustrated in FIG. 5A may be a mask 510 using two orthogonal functions, and the modulator illustrated in FIG. 5B may be a mask using four orthogonal functions. For example, in FIG. 5A, a function which is applied to light beams passing through the upper portion 511 of the mask 510 and a function which is applied to light beams passing through the lower portion 512 of the mask 510 may be functions which are orthogonal to each other.

FIG. 6 shows functions used in a modulator according to another exemplary embodiment.

FIG. 6 shows a first orthogonal function f which is applied to light beams passing through the upper portion 511 of a modulator mask, and a second orthogonal function g which is applied to light beams passing through the lower portion 512. In FIG. 6, "+" represents transmission of 100%, and "−" represents transmission of 0%. That is, according to the exemplary embodiment, the modulator mask includes a pattern for adjusting the transmission of light beams.

As illustrated in FIG. 6, orthogonal light beams are formed using the first and second orthogonal functions f and g of the modulator mask.

The operation can be expressed by the below Equation 2.

$$\text{view1} * f + \text{view2} * g = \text{Sum\_image} \qquad \text{Equation 2}$$

Here, * represents convolution, view1 represents a set of light beams passing through the upper portion 511 of the modulator mask, view2 represents a set of light beams passing through the lower portion 512, and Sum_image represents an image obtained by a photo sensor 340.

For example, if the main lens 310 (see FIG. 3) has two sub-aperture parts, two different views [100×100] are formed, wherein the two different views are two pieces of direction resolution information. A conventional method of forming existing light field data requires a photo sensor array 340 having a 200×200 size. However, according to the digital image capturing method according to the current embodiment, it will be sufficient if the photo sensor array 340 has a size 100×100. This is because two pieces of directional resolution information overlap by the first and second functions f and g. That is, since the first function f is orthogonal to the second function g, the data processor 360 can extract the original views view1 and view 2 from the image Sum_image.

FIGS. 7A through 7D show the locations of a modulator, according to exemplary embodiments.

As illustrated in FIGS. 7A through 7D, since two or more light beams are modulated and overlap on a pixel of a photo sensor array so that the light beams are identified before an image is formed on a photo sensor, the modulator can be disposed in front of a main lens, behind the main lens, in front of a microlens array, or behind the microlens array.

Figure 8:
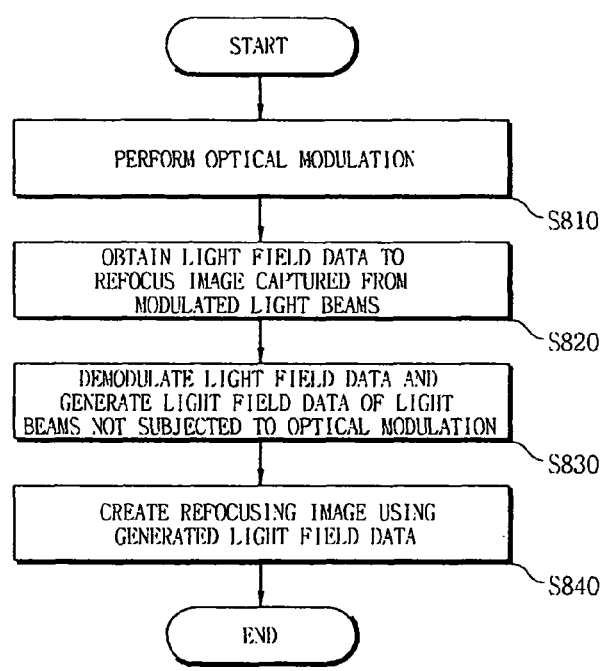
FIG. 8 is a flowchart of a method of capturing digital images.

FIG. 8 is a flowchart of a method of capturing digital images, according to an exemplary embodiment.

Optical modulation is performed on received light beams in order to identify the light beams when two or more of the light beams overlap (operation S810). The optical modulation can be performed through a 2-dimensional orthogonal mask using two or more orthogonal functions. Also, the 2-dimensional orthogonal mask includes a pattern for adjusting the transmission of light beams.

Then, light field data is obtained from the light beams subjected to optical modulation in order to refocus an image captured by the light beams (operation S820). Then, the light field data is demodulated and light field data of the original light beams is generated (operation S830). At this time, the light field data can be demodulated using two or more orthogonal functions which have been used for the optical modulation.

Then, a refocusing image is created using the light field data (operation S840).

According to an exemplary embodiment, by coding (that is, modulating) light beams using a known code, for example, an orthogonal code and then overlapping the light beams on each pixel of the photo sensor before an image is formed on a photo sensor array, it is possible to reduce the number of pixels required to achieve target directional resolution. Reducing the number of pixels required to achieve target directional resolution leads improvement of spatial resolution. In other words, it is possible to prevent spatial resolution from deteriorating when light field data for image refocusing is created.

The above-mentioned method according to the present embodiment can be implemented as a computer readable code in a computer-readable recording medium. Coding and code segments for implementing the program can be easily induced by computer programmers skilled in the art. The computer-readable recording medium may be ROM, RAM, CD-ROM, magnetic tape, floppy disk, optical disk, etc. Also, the computer readable recording medium can be distributed to computer systems connected through a network and can be stored and executed as a computer readable code in a distributed mode.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A digital image capturing apparatus, comprising: an image pickup unit obtaining light field data to change a view of a captured image and refocus the captured image, including:
   a modulator performing optical modulation on light beams; and
   plural light separation elements, where each of plural light separation elements is configured to redirect at least two incident light beams, incident to a respective separation element from different directions, toward a same portion of a photo sensor array so the at least two incident light beams are overlapping at the same portion, wherein the same portion is different for each of the plural separation elements; and
   a data processor generating a refocusing image using light field data captured by the photo sensor array, with the data processor demodulating the light field data of each same portion of the photo sensor array by separating each of the respective overlapping light beams of each same portion of the photo sensor array into separate identified light beams based on the modulation and identifying different incident directions of each of the separated light beams relative to the respective light separation element and at least one input aperture of the image pickup unit directing the at least two incident light beams toward the plural light separation elements,
   wherein the plural light separation elements include a main lens and a microlens array disposed between the main lens and the photo sensor array capturing the light beams, wherein the microlens array orients light beams collected from the main lens toward the photo sensor array through the microlens array,
   wherein a plurality of the overlapping light beams converge on the same portion of the photo sensor array and include directional resolution information,
   the modulator includes a 2-dimensional orthogonal mask to modulate the light beams using a first function applied to light beams passing through an upper portion of the mask and using a second function applied to light beams passing through a lower portion of the mask, the first and second functions being mathematically orthogonal to one another,
   the photo sensor array obtains an image by summing a first view representing light beams passing through the upper portion of the mask convolved with the first function, with a second view representing light beams passing through the lower portion of the mask convolved with the second function, and
   the directional resolution of the photo sensor array is greater than or equal to twice a spatial sampling rate of the photo sensor array.

2. The apparatus of claim 1, wherein the modulator includes a pattern for adjusting transmission of the light beams.

3. The apparatus of claim 1, wherein the data processor demodulates the light field data obtained by the optical modulation, using the two or more orthogonal functions.

4. The apparatus of claim 1, wherein the data processor further identifies a view depth of an object, represented in the light field data, based on the respective separated light beams and identified different incident directions of the respective separated light beams.

5. The apparatus of claim 4, wherein the data processor generates the
refocusing image of the object by creating a composed image focused on a virtual focused plane different from a detected focal plane of the object based on the identified view depth of the object and the identified different incident directions of the respective separated light beams.

6. A digital image capturing apparatus, comprising:
an image pickup unit obtaining light field data to change a view of a captured image and refocus the captured image; and
a data processor generating a refocusing image using the light field data,
wherein the image pickup unit performs optical modulation on light beams to obtain light field data of the modulated light beams so that the light beams are individually identified when two or more of the light beams overlap, and the data processor demodulates the light field data to obtain demodulated light field data of the light beams not subjected to the optical modulation, further comprising:
a main lens;
a modulator performing the optical modulation on the light beams;
a photo sensor array capturing the light beams; and
a microlens array disposed between the main lens and the photo sensor array,
wherein the microlens array orients light beams collected from the main lens toward the photo sensor array through the microlens array, and wherein the modulator is positioned to modulate light before entering the microlens array or after orientation of light beams by the microlens array,
wherein a plurality of the overlapping light beams converge on a same portion of the photo sensor array and include directional resolution information,
the modulator includes a 2-dimensional orthogonal mask to modulate the light beams using a first function applied to light beams passing through an upper portion of the mask and using a second function applied to light beams passing through a lower portion of the mask, the first and second functions being mathematically orthogonal to one another,
the photo sensor array obtains an image by summing a first view representing light beams passing through the upper portion of the mask convolved with the first function, with a second view representing light beams passing through the lower portion of the mask convolved with the second function, and
the directional resolution of the photo sensor array is greater than or equal to twice a spatial sampling rate of the photo sensor array.

7. The apparatus of claim 6, wherein the modulator includes a pattern for adjusting transmission of the light beams.

8. The apparatus of claim 6, wherein each microlens included in the microlens array overlap at least two light beams subjected to optical modulation on a pixel of the photo sensor array.

9. The apparatus of claim 6, wherein the data processor demodulates the light field data obtained by the optical modulation, using the two or more orthogonal functions.

10. A method of capturing digital images, comprising:
through plural redirections of at least two respective incident light beams, incident to a respective separation light element of plural light separation elements from different directions, each redirection redirecting the at least two respective incident light beams toward a same portion of a photo sensor array so the at least two incident light beams are overlapping at the same portion, wherein the same portion is different for each of the redirection by each of the light separation elements;
performing optical modulation on light beams so that the overlapped light beams of each of the same portions of the photo sensor array is separately identifiable based on the modulation;
obtaining light field data of the modulated light beams to refocus an image represented by the modulated light beams;
demodulating the light field data and generating demodulated light field data of the light beams by separating each of the respective overlapped light beams of each same portion of the photo sensor into separate identified light beams based on the modulation and identifying different incident directions of each of the separated light beams relative to the respective light separation element and at least one input aperture directing the at least two respective incident light beams toward the plural light separation elements; and
generating a refocused image using the generated light field data,
wherein the plural light separation elements include a main lens and a microlens array disposed between the main lens and the photo sensor array capturing the light beams, wherein the microlens array orients light beams collected from the main lens toward the photo sensor array through the microlens array,
wherein a plurality of the overlapping light beams converge on the same portion of the photo sensor array and include directional resolution information, and
the performing optical modulation includes:
modulating the light beams by using a 2-dimensional orthogonal mask to modulate the light beams using a first function applied to light beams passing through an upper portion of the mask and using a second function applied to light beams passing through a lower portion of the mask, the first and second functions being mathematically orthogonal to one another,
obtaining an image by summing a first view representing light beams passing through the upper portion of the mask convolved with the first function, with a second view representing light beams passing through the lower portion of the mask convolved with the second function, and
the directional resolution of the photo sensor array is greater than or equal to twice a spatial sampling rate of the photo sensor array.

11. The method of claim 10, wherein the 2-dimensional orthogonal mask includes a pattern for adjusting transmission of the light beams.

12. The method of claim 10, wherein the demodulation of the light field data comprises demodulating the light field data of the modulated light beams using the two or more orthogonal functions.

13. The method of claim 10, further comprising identifying a view depth of an object, represented in the light field data, based on the respective separated light beams and identified different incident directions of the respective separated light beams.

14. The method of claim 13, further comprising generating the refocusing image of the object by creating a composed image focused on a virtual focused plane different from a detected focal plane of the object based on the identified view depth of the object and the identified different incident directions of the respective separated light beams.

15. A digital image capturing apparatus, comprising:
an image pickup unit obtaining light field data, including a microlens array disposed between a lens and a photo sensor array, with each microlens of the microlens array redirecting respective light directed from the lens based upon direction of the respective light directed from at least one aperture of the lens, and with each of the microlenses of the microlens array redirecting the respective light toward a same portion of the photo sensor array to be overlapped on the same portion, wherein the same portion is different for each microlens; and
a data processor generating a view depth of an object using the light field data;
wherein the image pickup unit performs optical modulation on light beams to obtain light field data by the photo sensor array, of the modulated light beams, so that respective overlapped light beams incident to each same portion of the photo sensor array are separable and individually identifiable based on the modulation,
wherein the image pickup unit is configured so that the respective overlapped light beams are incident to the lens from different directions, and wherein the data processor separates the respective overlapped light beams into separate light beams and performs the individual identification of the respective separated light beams,
wherein a plurality of the overlapping light beams converge on the same portion of the photo sensor array and include directional resolution information,
the image pickup unit performs optical modulation using a 2-dimensional orthogonal mask to modulate the light beams using a first function applied to light beams passing through an upper portion of the mask and using a second function applied to light beams passing through a lower portion of the mask, the first and second functions being mathematically orthogonal to one another,
the photo sensor array obtains an image by summing a first view representing light beams passing through the upper portion of the mask convolved with the first function, with a second view representing light beams passing through the lower portion of the mask convolved with the second function, and
the directional resolution of the photo sensor array is greater than or equal to twice a spatial sampling rate of the photo sensor array.

16. The apparatus of claim 15, wherein the data processor further identifies a view depth of an object, represented in the light field data, based on the respective separated light beams and identified different incident directions of the respective separated light beams.

17. The apparatus of claim 16, wherein the data processor generates a
refocusing image of the object by creating a composed image focused on a virtual focused plane different from a detected focal plane of the object based on the identified view depth of the object and the identified different incident directions of the respective separated light beams.

18. A method of capturing digital images, comprising:
through plural redirections of different light beams directed from at least one aperture of a lens, respectively redirecting respective light beams directed from the at least one aperture of the lens to overlap on a same portion of a photo sensor array, wherein the same portion is different for each of the respective redirections;
performing optical modulation on light beams so that respective overlapped light beams incident to each same portion of the photo sensor array are separable and individually identifiable based on the modulation; and
demodulating light field data of the modulated light beams and generating demodulated light field data of the light beams, including separating each of the respective overlapped light beams into separate light beams based on the modulation, identifying each of the respective separated light beams as being a respective one of the different light beams directed from the at least one aperture, and identifying respective incident directions of each of the respective light beams directed from the at least one aperture before the redirection of the respective light beams to overlap on the same portion of the photo sensor array,
wherein the redirecting respective light beams directed from the at least one aperture of the lens to overlap on a same portion of a photo sensor array further comprises orienting light beams collected from the lens toward the photo sensor array through a microlens array disposed between the lens and the photo sensor array capturing the light beams,
wherein a plurality of the overlapping light beams converge on the same portion of the photo sensor array and include directional resolution information, and
the performing optical modulation includes:
modulating the light beams by using a 2-dimensional orthogonal mask to modulate the light beams using a first function applied to light beams passing through an upper portion of the mask and using a second function applied to light beams passing through a lower portion of the mask, the first and second functions being mathematically orthogonal to one another, and
obtaining an image by summing a first view representing light beams passing through the upper portion of the mask convolved with the first function, with a second view representing light beams passing through the lower portion of the mask convolved with the second function, and
the directional resolution of the photo sensor array is greater than or equal to twice a spatial sampling rate of the photo sensor array.

19. The method of claim 18, further comprising identifying a view depth of an object, represented in the light field data, based on the respective separated light beams and identified different incident directions of the respective separated light beams.

20. The method of claim 19, further comprising generating a refocusing image of the object by creating a composed image focused on a virtual focused plane different from a detected focal plane of the object based on the identified view depth of the object and the identified different incident directions of the respective separated light beams.

21. A digital image capturing apparatus, comprising:
a lens including at least one aperture;
a modulator performing the optical modulation on incident light beams;
a microlens array disposed between the lens and the photo sensor array, each respective microlens of the microlens array being configured to respectively redirect at least two light beams incident to the respective microlens to a same portion of a photo sensor array as respective light beams overlapping the same portion, wherein the same portion is different for each microlens, and wherein the digital image capturing apparatus is configured so the at least two light beams incident to the respective microlens are directed from the at least one aperture of the lens toward the respective microlens so the respective microlens produces the respective overlapped light beams; and
the photo sensor array, wherein the photo sensor array is configured relative to the microlens array so that each same portion of the photo sensor array captures each of the respective overlapped light beams,
wherein the modulator is positioned to modulate the incident light beams before being incident to the respective microlens or after production of the respective overlapped light beams by the respective microlens, such that the modulator is configured relative to the microlens array so that each of the captured respective overlapped light beams by each respective same portion of the photo sensor array are separately identifiable by a data processing device and so that a respective incidence direction of each separately identified light beam relative to the lens is identifiable by the data processing apparatus for identifying a focal plane of an object from which the object light beams are directed to the digital image capturing apparatus,
wherein a plurality of the overlapping light beams converge on the same portion of the photo sensor array and include directional resolution information,
the modulator includes a 2-dimensional orthogonal mask to modulate the light beams using a first function applied to light beams passing through an upper portion of the mask and using a second function applied to light beams passing through a lower portion of the mask, the first and second functions being mathematically orthogonal to one another,
the photo sensor array obtains an image by summing a first view representing light beams passing through the upper portion of the mask convolved with the first function, with a second view representing light beams passing through the lower portion of the mask convolved with the second function, and
the directional resolution of the photo sensor array is greater than or equal to twice a spatial sampling rate of the photo sensor array.

* * * * *